(12) United States Patent
Williamson

(10) Patent No.: US 8,128,730 B2
(45) Date of Patent: Mar. 6, 2012

(54) DEFOAMING SONOTRODE SYSTEM

(75) Inventor: James T. Williamson, West Liberty, OH (US)

(73) Assignee: New Sonic Technologies, LLC, Bonita, CA (US)

( * ) Notice: Subject to any disclaimer, the term of this patent is extended or adjusted under 35 U.S.C. 154(b) by 440 days.

(21) Appl. No.: 12/437,710

(22) Filed: May 8, 2009

(65) Prior Publication Data

US 2009/0277533 A1  Nov. 12, 2009

Related U.S. Application Data

(60) Provisional application No. 61/051,376, filed on May 8, 2008.

(51) Int. Cl.
*B01D 19/02* (2006.01)

(52) U.S. Cl. .............................. 95/30; 96/175

(58) Field of Classification Search ......... 95/30; 96/175
See application file for complete search history.

(56) References Cited

U.S. PATENT DOCUMENTS

| | | | |
|---|---|---|---|
| 3,229,448 A * | 1/1966 | Jacke | 96/175 |
| 3,505,726 A * | 4/1970 | Jaroslav et al. | 228/110.1 |
| 4,295,502 A * | 10/1981 | Matzner | 95/30 |
| 4,339,247 A | 7/1982 | Faulkner et al. | 55/15 |
| 5,447,016 A | 9/1995 | Ueda et al. | 53/510 |
| 6,210,470 B1 | 4/2001 | Philips et al. | 96/175 |
| 6,590,000 B2 | 7/2003 | Varadaraj | 516/123 |
| 6,620,226 B2 | 9/2003 | Hutton et al. | 96/175 |
| 6,626,196 B2 | 9/2003 | Downes, Jr. et al. | 134/184 |
| 6,694,705 B1 | 2/2004 | Frei et al. | 53/428 |
| 6,795,484 B1 | 9/2004 | Huber et al. | 373/27 |
| 7,470,363 B2 | 12/2008 | Milo | 210/188 |
| 7,632,336 B2 | 12/2009 | Williams et al. | 95/30 |
| 7,766,121 B2 | 8/2010 | Hadfield et al. | 181/142 |
| 2009/0020412 A1 * | 1/2009 | Takenouchi et al. | 204/158.2 |

FOREIGN PATENT DOCUMENTS

GB  2444039 A  *  5/2008

* cited by examiner

*Primary Examiner* — Duane Smith
*Assistant Examiner* — Douglas Theisen
(74) *Attorney, Agent, or Firm* — Brinks Hofer Gilson & Lione

(57) ABSTRACT

A sonotrode specially adapted for defoaming liquids during container filing operations, has an upper body portion having a first diameter and having an upper face adapted to be mounted to a driving transducer, a middle body portion having a second diameter larger than the first diameter situated below the upper body portion, a generally conical portion situated between the upper body portion the middle body portion, and a transition portion situated between the middle body portion and a lower face adapted to be directed toward a liquid upper surface within a container, the lower face being generally rectangular.

15 Claims, 8 Drawing Sheets

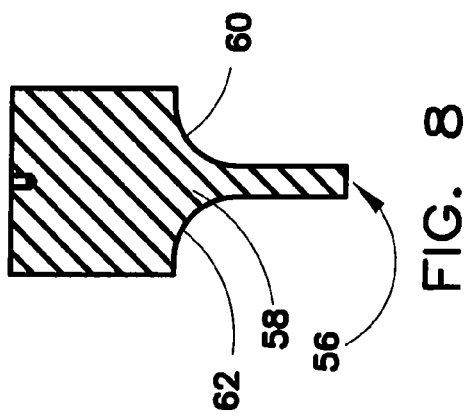
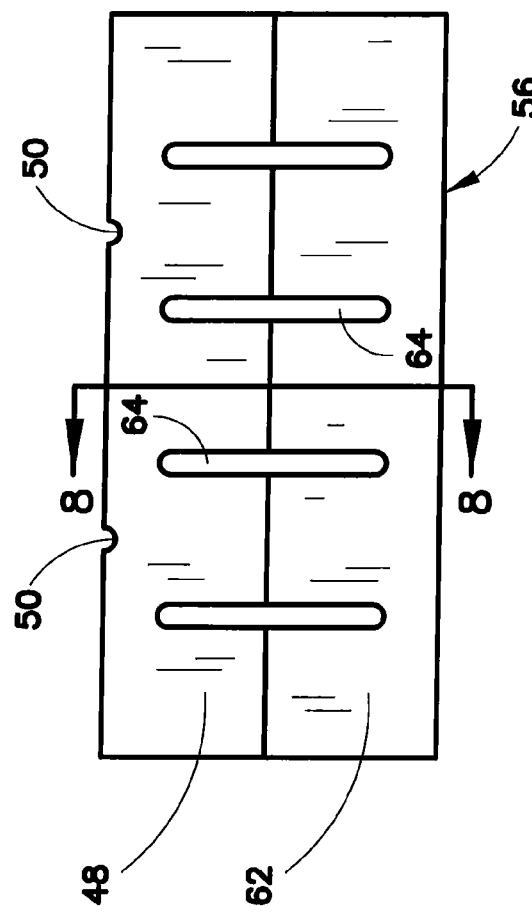
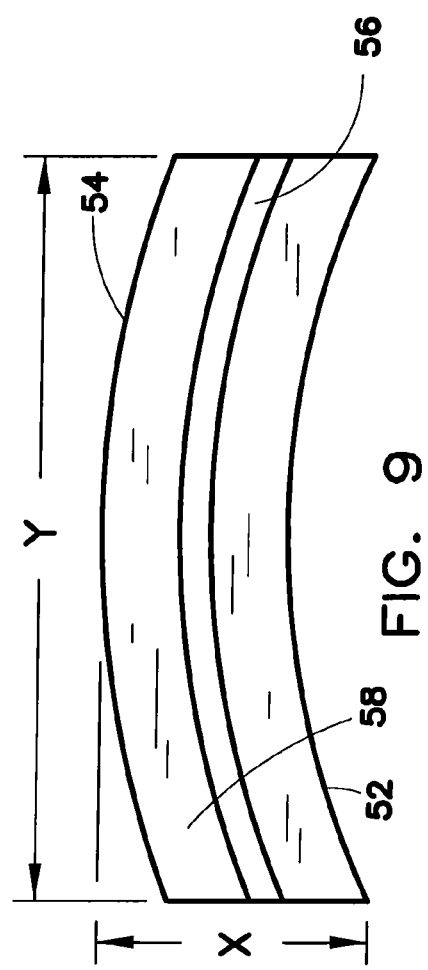

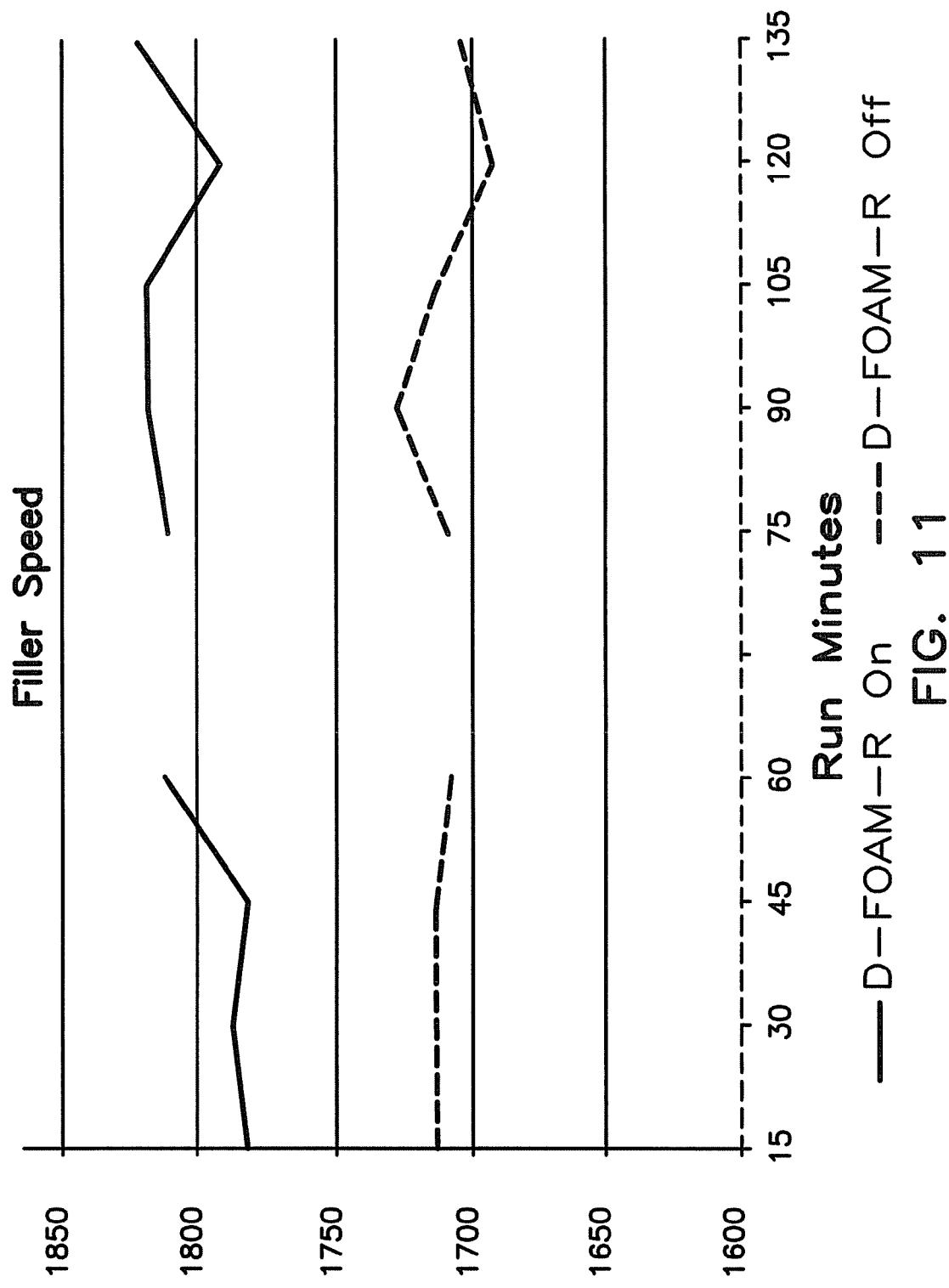

DEFOAMING SONOTRODE SYSTEM

CROSS-REFERENCE TO RELATED APPLICATION

This application is related to, and claims all available benefit of, U.S. provisional application Ser. No. 61/051,376 filed May 8, 2008.

BACKGROUND OF THE INVENTION

1. Field of the Invention

The present invention generally relates to methods for limiting or controlling the foam above the top surface of a liquid. More particularly, the invention is directed to a methods utilizing ultrasonic energy to control foam by breaking the surface tension of the bubbles creating the foam above the liquid. The invention has application in the filling of containers with carbonated beverages, including soft drinks and beer, where the control or elimination of foam can enable higher production speeds, improved yields, reduced energy costs and improved net content capabilities. Other uses include foam control during container filing with non-carbonated liquids including juices, teas, sports drinks, liquid cleaners and wine. The present invention is not restricted by the material used in the container construction, which can include materials such as aluminum, steel, plastics, glass and composites. Other uses also include foam reduction from continuous streams of emulsions, suspensions, and high viscosity liquids used during the production of various commercial products.

2. Description of the Prior Art

For reasons of economy, commercial containers are not sized substantially larger than as required for accommodation of the contents. Thus, during filing operations it is common for some amount of liquid in the form of foam to bubble over the top of the container prior to the container being capped or sealed. The product loss can reach as high as ten percent, which translates into higher cost for the consumer or lower profitability for the bottler, or both. To reduce this product loss, some filing lines include a dwell station that allows for the product foam in a recently filled container to settle prior to top sealing. Other filing lines include a short suction pipe adapted to be introduced into the container to be sealed, and a suction system whereby the foam over the top surface of the liquid is removed and optionally recycled into the product reservoir. Some filing lines may also use blast nozzles for blowing any drops and residual foam from the surfaces to be sealed or bonded. Some filling lines reduce the temperature of the liquid at the mixing tanks or other reservoirs to reduce foaming. Other filled products are purposefully overfilled to compensate for lost product in the form of foam and thereby achieve the desired net fill volume, which results in undesirable product loss.

Matzner, U.S. Pat. No. 4,295,502 discloses that foam can be collapsed in place by subjecting the foam structure to high-frequency wave radiation from a source spaced above the liquid. The portion of liquid forming the foam then again becomes part of the liquid content of the container, rather than being wasted. Sound waves, primarily those above the sonic range, are used with the high-frequency range in the neighborhood of 20,000 Hz. The ultrasonic radiation is directed toward the top of the liquid. This results in a concentration of the radiation on the foam structure. Matzner reports particularly good results are obtained in the destruction of foam when a plurality of overlapping ultrasonic wave fields extending in substantially the same direction are caused to act on the foam structure. Matzner discloses using eight parallel ultrasonic wave fields radiating into the foam by an appropriately designed horn or sonotrode. After an exposure time of just 0.2 to 0.3 seconds the foam is reportedly destroyed to an extent not usually attainable by a suction arrangement.

Matzner additionally indicates that when sonotrodes are used for the radiation of ultrasonic waves, it is advantageous to combine a plurality of sonotrodes into a bank of sonotrodes or into an aggregate sonotrode. The individual sonotrodes are advantageously constructed as pins and arranged parallel to one another on a metal block to permit them to radiate the individual ultrasonic wave fields side by side and close together into the foam. In order that the foam layer over the liquid may be fully covered even by a focused radiation field, Matzner indicates it is advisable to adapt the aggregate sonotrode to the cross-sectional configuration of the container in the area of the liquid level.

While the exposure time of 0.2 or 0.3 seconds seems to be very short, the fact remains that current filling lines often run at speeds of between 800 and 2000 containers per minute. Thus, one following the Matzner disclosure would necessarily have to provide a series of such aggregate sonotrodes, or an elongated sonotrode array, aligned along the filling line so that each container traveled under serially under several aggregate sonotrodes in order to achieve the required exposure time. Thus there is an unsatisfied need for an operating single defoaming sonotrode that can effectively eliminate foam from the top of a container of liquid while the container is traveling on a high-speed filing line.

Continuous streams of emulsions, suspensions, and moderate to high viscosity liquids are used during the production of various commercial products including paper slurries, photographic products, mineral ores, and waste stream management. The continuous streams can develop a layer of froth or foam on top of a liquid. In some processes, the foam or froth is used as a separating mechanism to concentrate and separate one portion of the continuous stream from the remainder of the stream. After separation of the foam or froth containing the separated portion of the stream, it can become desirable to return much of the liquid fraction forming the froth or foam to the continuous stream. In other processes, the presence of the froth or foam is undesirable and performs no useful function whatsoever. The foam and froth have been known to be reduced by placing ultrasonic transducers in or under the continuous stream to assist in the degasifying of the stream. Examples are to be found in Jacke, U.S. Pat. No. 3,229,448; Philips et al., U.S. Pat. No. 6,210,470; and Varadaraj, U.S. Pat. No. 6,590,000. It has been recognized that in some cases it is desirable to physically separate the ultrasonic transducer from the stream, but there is an unsatisfied need for a single defoaming sonotrode operating so as to effectively eliminate foam from the top of a continuous stream of liquid while the liquid is traveling at a high rate of speed.

SUMMARY OF THE INVENTION

In one aspect, a sonotrode system is provided for defoaming a series of open mouth containers of liquid as they pass continuously along a filling line operating at sufficiently high speed that each container open mouth is exposed to a sonotrode for less than 0.1 seconds and more typically between about 0.08 seconds to 0.03 seconds. The sonotrode has a driving transducer mounting face at an upper end and an elongated sonotrode face at a lower end directed toward the foam in the vicinity of the container open mouth. The lower end face of the sonotrode has only a single continuous planar lower face that can have a variety of generally elongated shapes including generally rectangular, arcuate and serpentine. The continuous planar lower face can be defined by a first horizontal dimension and a second orthogonal horizontal dimension. One of the first and second horizontal dimensions can be equal to a width dimension of the open mouth of the series of containers. The sonotrode lower end can be positioned above the container open mouth by a distance of between 25 mm and 75 mm measured from the desired fill line of the container.

In another system, a sonotrode is provided for defoaming a container of liquid that has an amplitude gain of between 2/1 to 10/1 between the driving transducer and the sonotrode face directed toward the foam. The gain can be defined at least in part by the geometry of the sonotrode to achieve a desired downward focus of the ultrasonic waves toward the open mouths of the passing containers. The gain and/or performance may also be defined in part by the shape of the lower end face of the sonotrode and/or the presence of selected grooves and openings in the upper end or body of the sonotrode.

In yet another aspect, the sonotrode can be positioned with the sonotrode face located at a range of heights above the liquid for various container volumes, filling speeds, and continuous stream flow velocities. The sonotrode lower end can be positioned above the container open mouth by a distance of between 25 mm and 75 mm measured from the desired fill line of the container.

In the various aspects of the present invention the dimensions of the body portion as compared to the elongated face at the foam level can be important when considering the overall length of the sonotrode and the mass of the mounting face at the driving transducer. The transition from the larger dimensioned body to the elongated face can be between about 5 mm and about 15 mm in an X direction with a corresponding dimension of between about 25 mm and about 300 mm in a Y direction perpendicular to the X direction. The sonotrode length in a Z direction between the driving transducer face and the sonotrode lower end face can be important to the development of the amplitude necessary for defoaming action and to the development of sufficient gain ratio. Generally the Z dimension is much larger than either the X or Y dimension.

In the various aspects of the present invention, the blend radii at the intersections of the X and Y dimensions can be a function of the dimensions of the resulting rectangle at the sonotrode lower end, the amplitude gain over the length of the sonotrode, and the bleed off of energy as a result of the sizes. Additionally, the lower end face of the sonotrode can include other edges defining a curve in the plane of the lower end face so that the lower end face as a whole appears curved or serpentine. At least one of the dimensions of the sonotrode lower end can be selected in relation to the containers to be employed on a given filing line to maximize the desired foam impact in a minimum of exposure time.

One feature of the sonotrode of the present invention is the capability of the sonotrode to achieve additional gains in amplitude through external means that boost the amplitude without changing the inherent gain rate of the sonotrode itself. The sonotrode can be included in a system capable of supplying a variable amount of power at a controlled frequency that can be fixed for a given line of containers and filled product. The system can include sensors and other controls for facilitating continuous operation of the system in response to the operation of the filling line conditions.

Other features and advantages of the present invention will become apparent to those skilled in the art from the following disclosure of preferred embodiments of the present invention exemplifying the best mode of practicing the invention. The following disclosure references the accompanying drawings illustrating the preferred embodiments.

BRIEF DESCRIPTION OF THE DRAWINGS

FIG. 7 is a side elevation view of the sonotrode shown in FIG. 6.

FIG. 8 is a sectional view of the sonotrode shown in FIGS. 6 and 7, taken through line 8-8.

FIG. 9 is a bottom plan view of the sonotrode shown in FIGS. 6-8.

FIG. 11 is a graph showing the number of containers satisfactorily filled during 15 minute intervals, with and without the use of a sonotrode assembly of the present invention.

DESCRIPTION OF PREFERRED EMBODIMENTS

Figure 1:
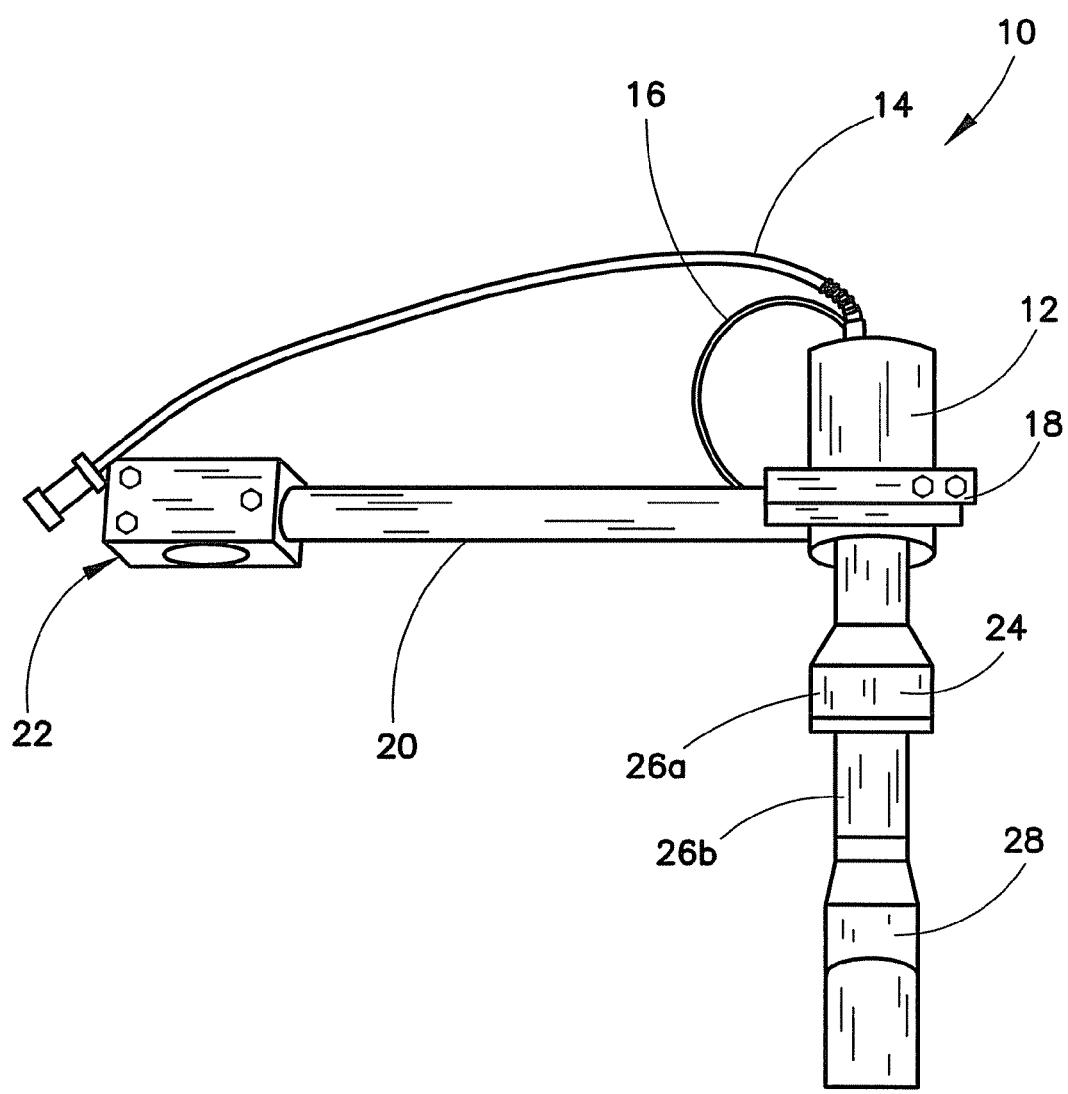
FIG. 1 is a perspective view of a sonotrode embodying the present invention including some mounting hardware and connections.

A sonotrode assembly 10 can have an ultrasonic transducer 12 that includes a control input 14 for supplying power to the transducer 12 as shown in FIG. 1. The assembly 10 can also include a line 16 for supplying coolant to the transducer 12. The coolant can be air or other gas that may be chilled and/or pressurized and caused to flow through the line 16 from a remote source. The assembly 10 can also include a support 18 fixed to the transducer 12 including a member 20 extending from the support 18 to a fixture 22 designed for attachment to a stand, post, stage or platform, not shown. An ultrasonic stack 24 can be provided, which can include a number of intermediate elements 26a, 26b, to couple the transducer 12 to a sonotrode 28.

Figure 4:
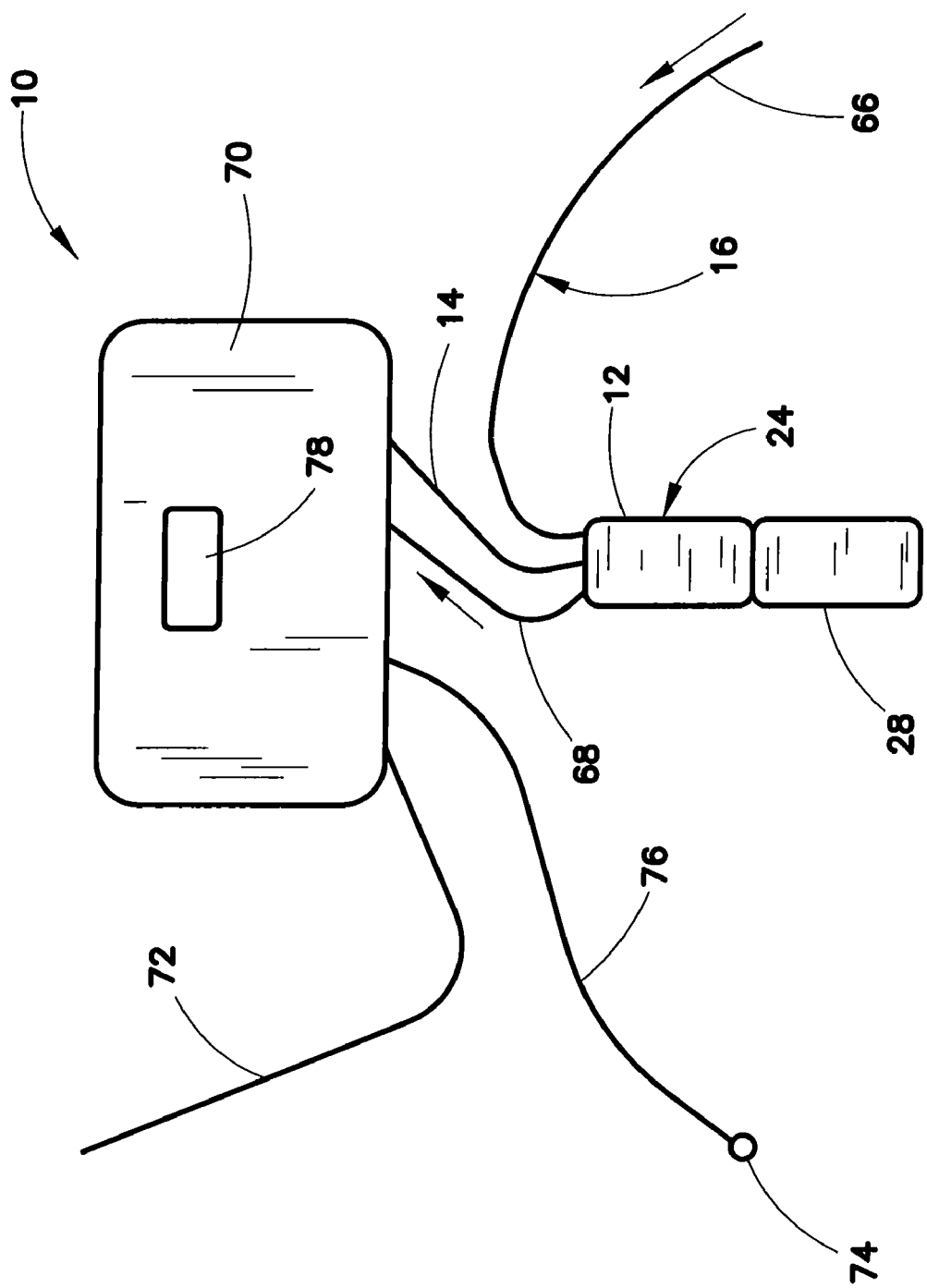
FIG. 4 is a schematic view of the apparatus shown in FIG. 1 together with a control unit.
Figure 5:
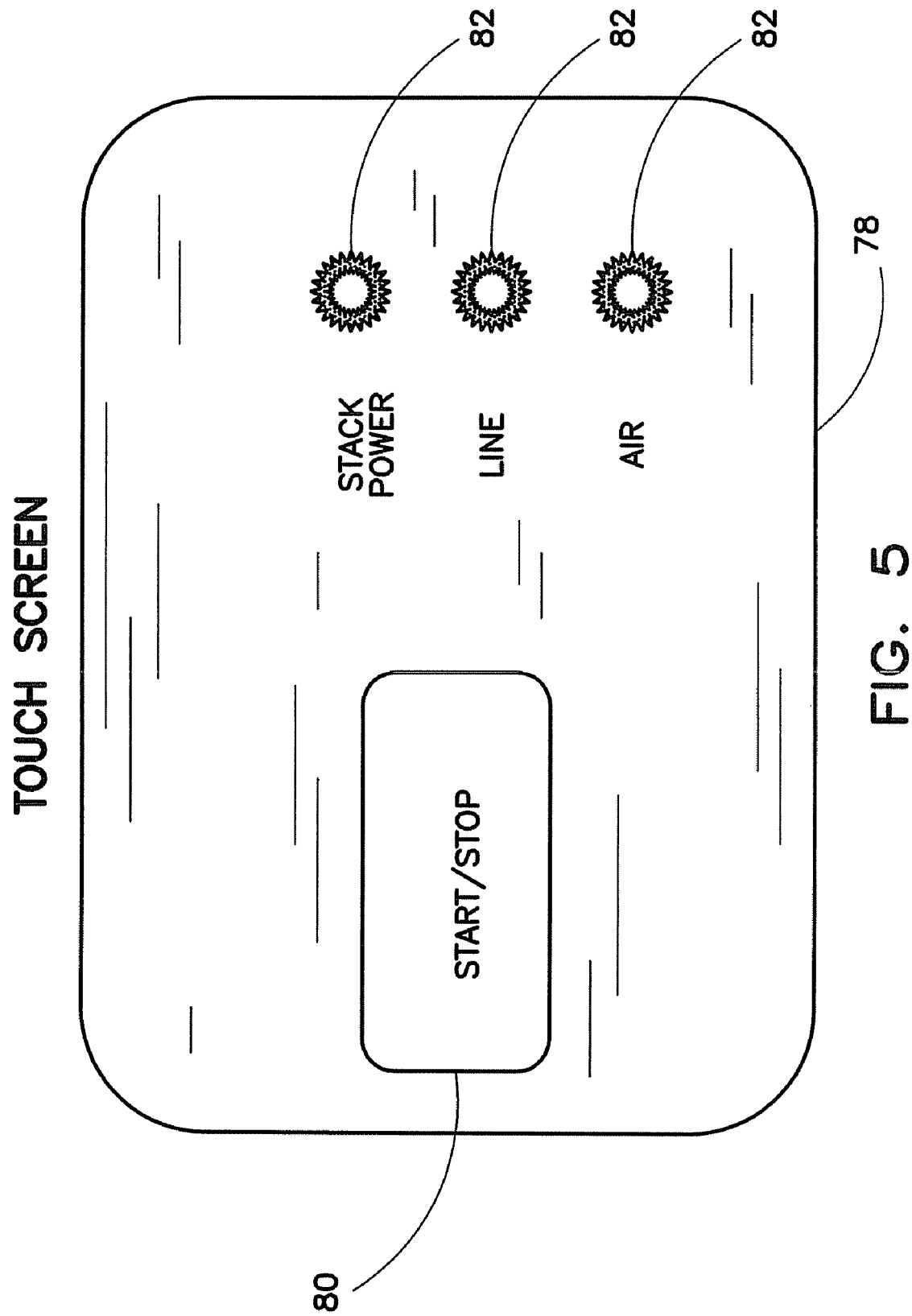
FIG. 5 is a plan view of the control unit shown in FIG. 4.
Figure 6:
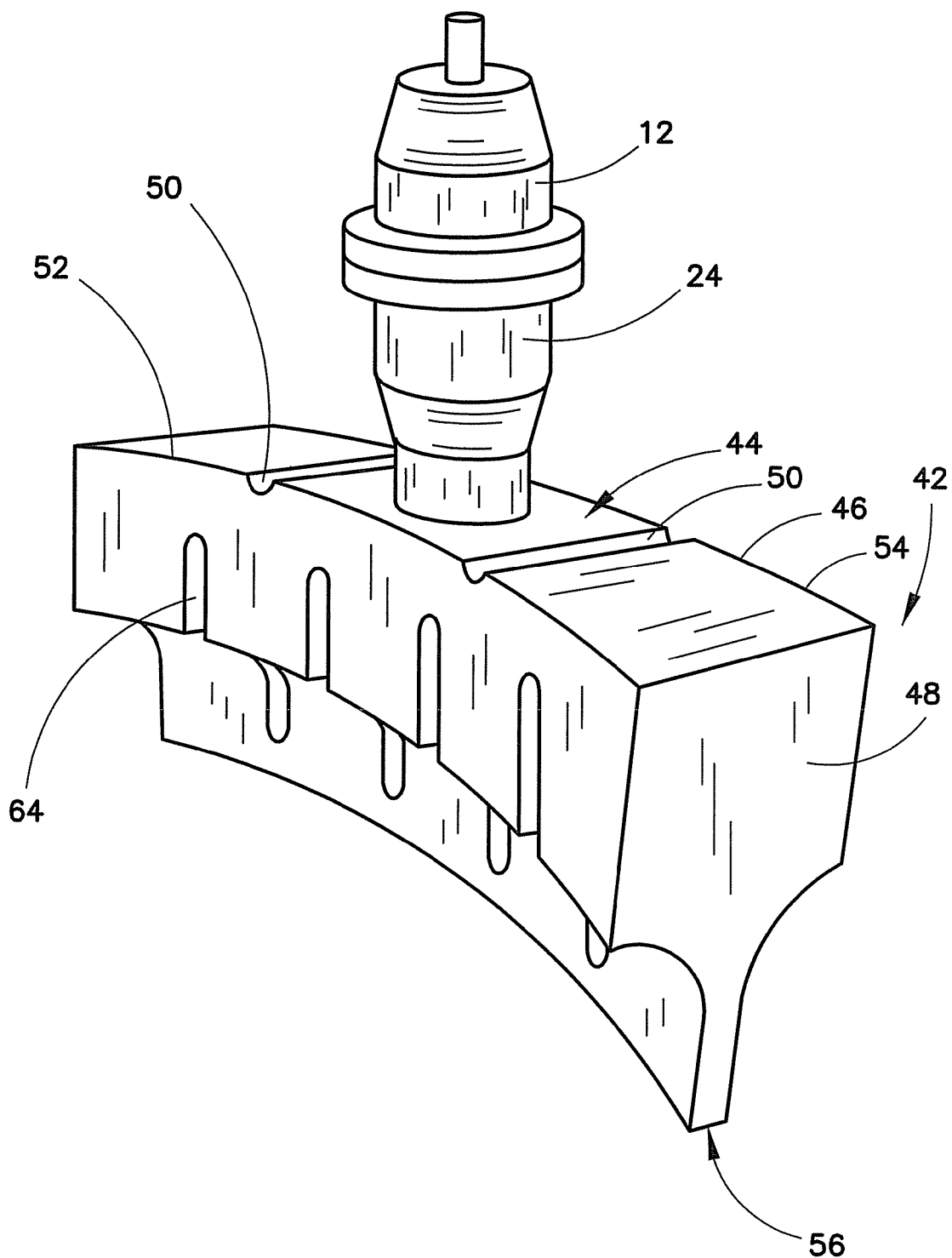
FIG. 6 is a perspective view of another sonotrode embodying the present invention.

A sonotrode assembly 10 is schematically shown in FIG. 4 to have an ultrasonic transducer 12 that includes a control input 14 for supplying power to the transducer 12. The assembly 10 can also include a line 16 for supplying coolant to the transducer 12. As indicated previously, the coolant can be air or other gas that may be chilled and/or pressurized and caused to flow through the line 16 from a remote source 66. An exhaust line 68 can also be provided leading away from the transducer 12 to ensure that the exhaust coolant does not contaminate or interfere with the product being subjected to treatment by the assembly 10. The control input 14 leads from the transducer 12 to a control cabinet 70 that can be remotely positioned at a convenient location for the operation of the assembly 10. A power supply line 72 can supply suitable electrical power to the control cabinet 70. A proximity switch 74 can be connected by line 76 to the control cabinet 70 to provide information concerning the relative location of the product being subjected to treatment by the assembly 10. A touch screen 78 can be included on the control cabinet to provide for ease of operation of the foam-reducing transducer stack 24. An exemplary touch screen 78 is illustrated in detail in FIG. 5. The touch screen 78 is shown to include simply a start/stop touch sensor 80 and three lights 82 indicating whether the designated systems are operational.

Figures 2, 3:
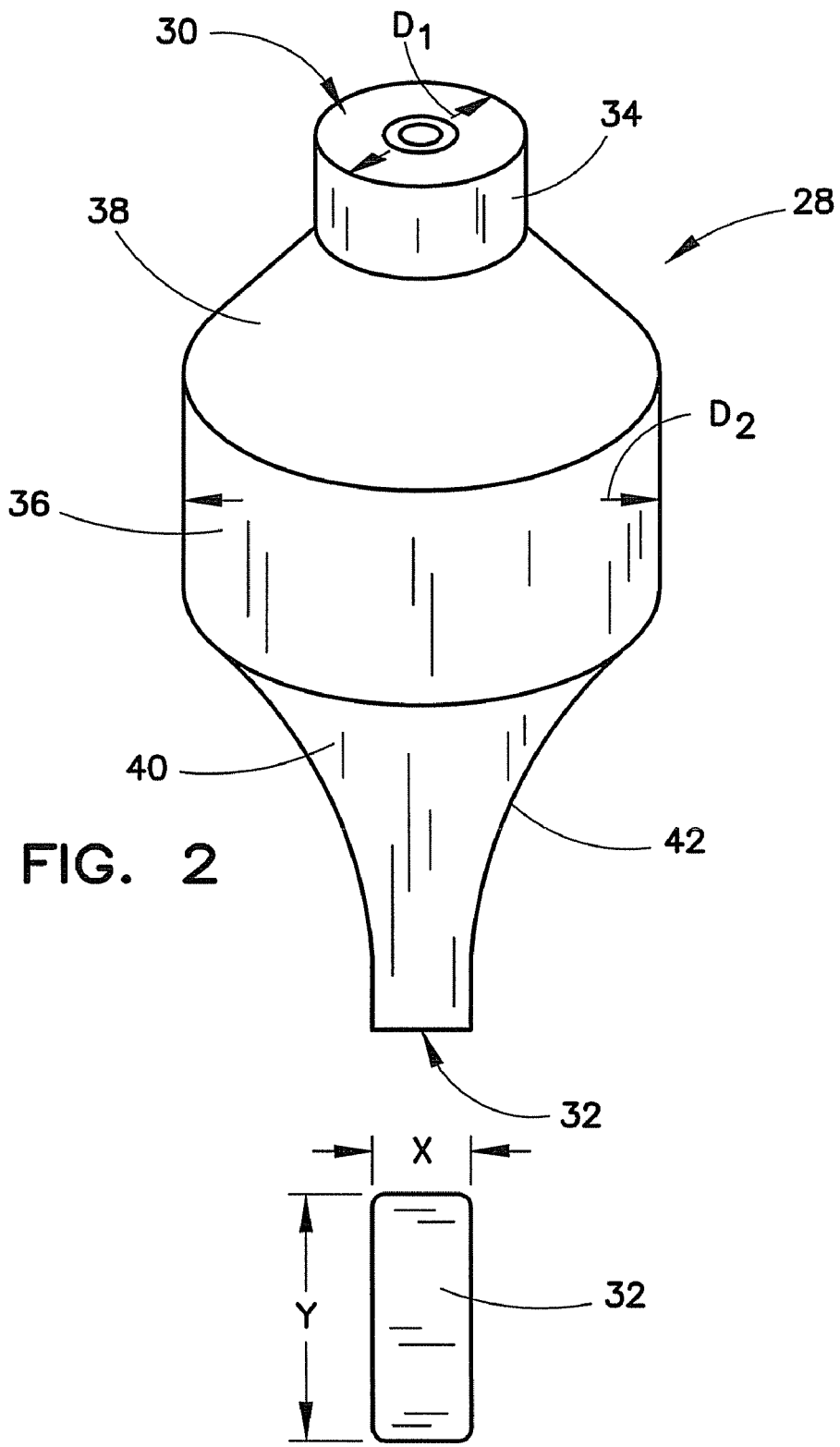
FIG. 2 is a perspective view of the sonotrode at right angle to that shown in FIG. 1.
FIG. 3 is a plan view of the lower end of FIG. 2.

The sonotrode 28 is illustrated in greater detail in FIGS. 2 and 3 to have an upper face 30 including a centrally located upper end coupling adapted to be mounted to the transducer 12 or the ultrasonic stack 24 leading to the transducer 12. The sonotrode 28 also has a lower face 32 shown in FIG. 3 that can be generally rectangular and having overall dimensions X and Y. Between the upper face 30 and the lower face 32, the sonotrode 28 can include an upper body portion 34 having a first diameter $D_1$. A middle body portion 36 having a second diameter $D_2$ is situated below the upper body portion 34. The middle body portion 36 is illustrated to be generally cylindrical, but can assume other shapes. A generally conical portion 38 can be situated between the upper body portion 34 and the middle body portion 36. A transition portion 40 can be situated between the middle body portion 36 and the lower face 32. In a first approximation, the amplitude gain between the upper face 30 and the lower face 32 is in an inverse relation to the ratio of the areas of the two faces 30 and 32. For example, if the area of the lower face 32 is only ¼ the area of the upper face 30, the amplitude gain is about 4/1. It is desirable that sonotrodes used in connection with the control of foam in container filing lines have amplitude gains of between about 2/1 to about 10/1 so that the foam reduction is achieved in as short an amount of time as possible, thereby allowing the filing line to be operated at enhanced speeds.

The transition portion 40 of the sonotrode 28, extending from the larger diameter middle body portion 36 to the generally rectangular lower face 32, can take the form of a concavely tapered outer surface 42 in at least one dimension. The lower face 32 can between about 5 mm and 15 mm in the X direction. The X dimension of the lower face 32 is generally smaller than the diameter $D_1$ of the upper body portion 34. The lower face 32 can be between about 25 mm and about 300 mm in the Y direction. The Y dimension of the lower face 32 is usually at least as large as, and is generally larger than, the diameter $D_1$ of the upper body portion 34. At least one of the dimensions X or Y can be chosen in relation to the diameter of the open mouth of the containers that are expected to pass below the lower end face 32 of the sonotrode 28. The sonotrode 28 is preferably made of titanium or a high carbon and vanadium tool steel such as Crucible CPM 10V.

Another sonotrode 42 is illustrated in FIGS. 6-9 that has an upper face 44 adapted to be mounted to a transducer 12 or an ultrasonic stack 24 leading to a transducer 12. The upper face 44 is shown to have an outer perimeter 46 defining a slightly arcuate rectangle defining the dimensions of a body portion 48 of the sonotrode 42. The upper face 44 of the sonotrode 42 is also shown to be generally planar, but includes a pair of grooves 50 extending from one arcuate edge 52 to an opposite arcuate edge 54 of the body portion 48. The grooves 50 can be parallel or along radius lines defined by the arcs of the edges 52 and 54.

The sonotrode 42 also has a lower face 56 shown in FIGS. 8 and 9 that also takes the form of a slightly arcuate rectangle having overall dimensions X and Y. The lower face 56 can between about 5 mm and 15 mm in the X direction. The lower face 56 can be between about 75 mm and about 300 mm in the Y direction. A transition portion 58 can be situated between the body portion 48 and the lower face 56. The transition portion 58 can have concavely tapered outer surface 60 and 62. The transition portion 58 and the body portion 48 can include at least one opening 64 extending between surfaces 60 and 62 and generally parallel to grooves 50. In a preferred embodiment the grooves 50 are arranged in pairs with members of each pair being located on opposite sides of the location of the transducer 12. Further, in a preferred embodiment, the openings 64 are located mid-way between adjacent grooves 50. The grooves 50 are dimensioned to enhance the amplitude gain of the sonotrode 42

Figure 10:
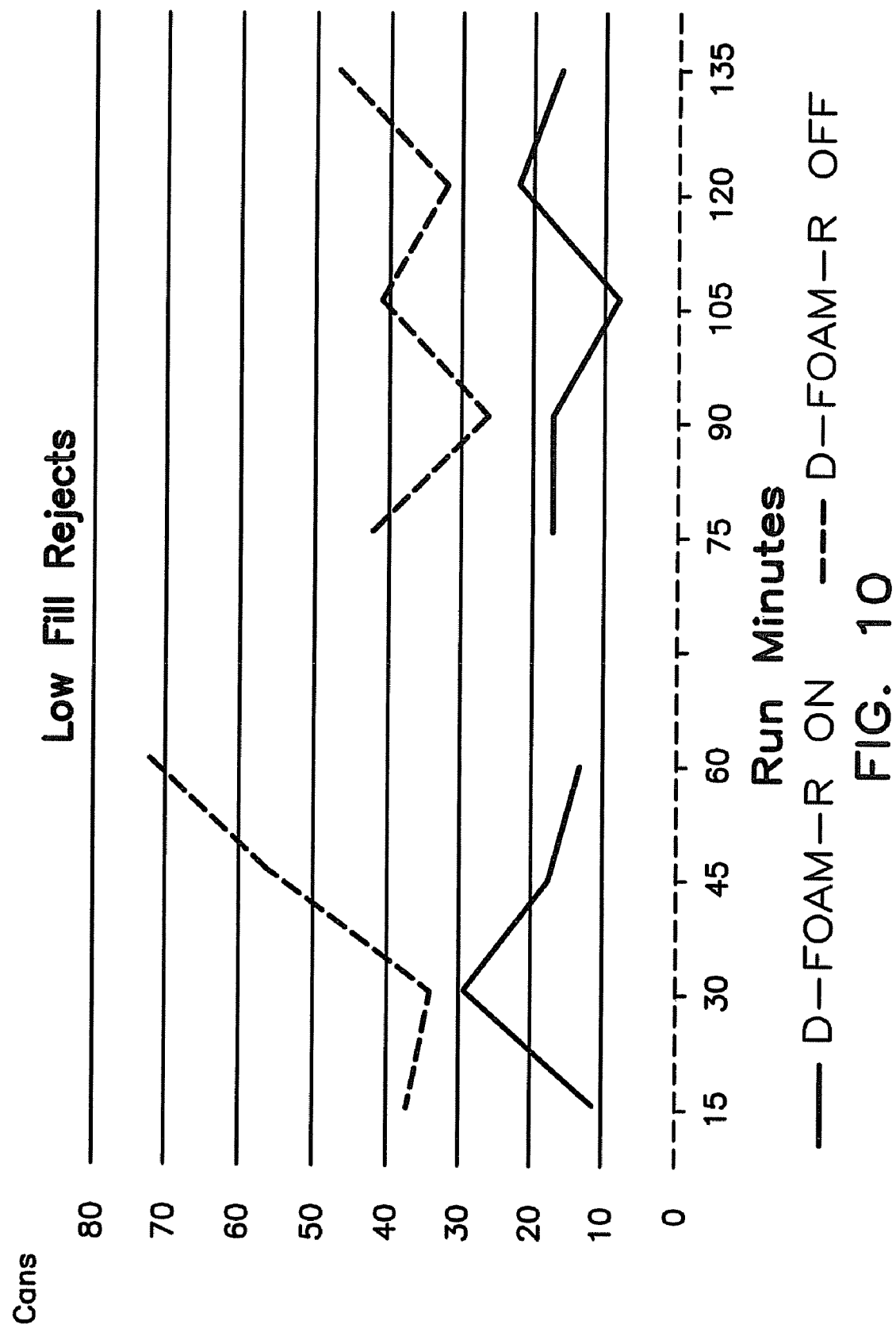
FIG. 10 is a graph showing the number of containers rejected during 15 minute intervals due to under filling of the containers, with and without the use of a sonotrode assembly of the present invention.

By way of example, the sonotrode 28, within the dimensional range specified previously for sonotrode 28, running at 20 kHz and at 1200 Watts continuous duty exhibited a gain ratio on the sonotrode of 4/1, and provided for nearly complete foam destruction with the lower face 32 situated between about 25 mm to 40 mm above the liquid upper surface of a passing line of containers. Additionally, since the foam above the surface of the containers was essentially transformed into liquid which returned to the interior of the containers, the number of containers rejected due to inadequate filling of the container fell significantly. FIG. 10 is a graph showing the number of containers rejected during 15 minute intervals due to under filling of the containers, with and without the use of a sonotrode assembly 10 including the sonotrode 28 on the same filing line. It will be seen that the number of container rejected due to under filing with the sonotrode is always less that when the sonotrode 28 is not used. Additionally, when the sonotrode 28 was used, the filling line was operated at an increased speed allowing even more satisfactorily filled containers to be produced in each time interval. This fact is reflected in FIG. 11, which shows the number of containers satisfactorily filled during similar 15 minute intervals. During the periods reflected in the graphs, the number of containers filled increased by more than 5%, while the number of rejected containers was reduced by more than 60%.

From the forgoing description of the structure and operation of a preferred embodiment of the present invention, it will be apparent to those skilled in the art that the present invention is susceptible to numerous modifications and embodiments within the ability of those skilled in the art and without exercise of the inventive facility. Accordingly, the scope of the present invention is defined as set forth of the following claims.

What is claimed is:

1. A system for controlling foam between a filling position and a capping position on a filling line containing a moving series of open mouth containers, the containers having a target fill point, the system comprising: a sonotrode including an upper end and a lower end, the lower end only having a single continuous planar face defined by a first horizontal dimension and a second orthogonal horizontal dimension less than ¼ of the lower end first horizontal dimension, the lower end being positioned over the filling line at a known distance above the target fill point of the containers, and a transducer coupled to the upper end of the sonotrode and to a power supply to supply power at a frequency selected to cause ultrasonic vibration of the sonotrode lower end that reduces foam above the target fill point of the containers.

2. A system according to claim 1, wherein one of the first and second horizontal dimensions of the single continuous planar face of the sonotrode lower end is equal to a width dimension of the open mouth of the series of containers.

3. A system according to claim 1, wherein the distance that the sonotrode lower end is situated above the containers is between about 25 mm to 75 mm above the target fill point of the passing line of containers.

4. A system according to claim 3, wherein the sonotrode lower end is situated about 40 mm above the target fill point of the passing line of containers.

5. A system according to claim 1, wherein the geometry of the sonotrode provides for an amplitude gain of between 2/1 and 10/1 between the transducer and the sonotrode lower end.

6. A system according to claim 1, wherein the first horizontal dimension of the sonotrode lower end is between about 25 mm and 300 mm.

7. A system according to claim 6, wherein the second horizontal dimension of the sonotrode lower end is between about 5 mm and 15 mm.

8. A system according to claim 7, wherein an edge of the sonotrode lower end planar face defines a curve in the plane of the lower end face.

9. A system according to claim 1 further comprising a coolant supply coupled to the transducer for supplying a continuous flow to the transducer.

10. A system according to claim 9 further comprising an exhaust line coupled to the transducer for removing coolant from the transducer in a manner inhibiting contamination of the containers.

11. A sonotrode comprising a metal body having an upper end including a coupling adapted to be coupled to an ultrasonic transducer and a lower end consisting of only a single continuous planar face having an edge defining a serpentine curve in the plane of the lower end face.

12. A sonotrode comprising a metal body having an upper end including a coupling adapted to be coupled to an ultrasonic transducer and a lower end consisting of only a single continuous planar face having an edge defining a curve in the plane of the lower end face, wherein the upper end coupling for the transducer is centrally located and the upper end includes at least one pair of parallel grooves extending entirely across the sonotrode upper end, the grooves being spaced outwardly on opposite sides of the transducer coupling.

13. A sonotrode according to claim 12, further comprising a first side and a second side opposite the first side, and a plurality of slots extending through the sonotrode between the first and second sides, each of said grooves across the sonotrode upper end being positioned midway between an adjacent pair of the slots.

14. A method for controlling foam during the filling and capping of a moving series of open mouth containers on a filling line comprising the steps of: coupling an upper end of a sonotrode to a transducer, positioning a lower end of the sonotrode above the moving series of containers, the sonotrode lower end being spaced above the target fill point of the moving series of containers by between about 25 mm to 75 mm, aligning the sonotrode lower end so that the entire container open mouth of each container passes directly under at least a portion of the sonotrode lower end for a period of time no greater than 0.1 seconds, and operating the transducer so as to induce an ultrasonic vibration in the sonotrode lower end to inhibit foam production prior to capping.

15. The method of claim 14, wherein the open mouth of each container is situated beneath the sonotrode lower end for between 0.08 to 0.03 seconds.

* * * * *